United States Patent
Szeremeta et al.

(10) Patent No.: US 9,892,762 B1
(45) Date of Patent: Feb. 13, 2018

(54) SELF RETAINING ELASTOMERIC SEAL

(75) Inventors: Wojciech Szeremeta, Mission Viejo, CA (US); Brian S. Nihei, Fountain Valley, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 255 days.

(21) Appl. No.: 13/308,423

(22) Filed: Nov. 30, 2011

(51) Int. Cl.
*G11B 33/14* (2006.01)
*F16J 15/02* (2006.01)
*F16J 15/08* (2006.01)

(52) U.S. Cl.
CPC ......... *G11B 33/142* (2013.01); *F16J 15/0887* (2013.01)

(58) Field of Classification Search
CPC ...... F16J 15/0887; F16J 15/061; G06F 1/187; G11B 33/142
USPC ........ 277/637, 644, 643, 649; 361/799, 816, 361/679.02, 679.09, 679.15, 679.16, 728, 361/730, 732; 220/378, 849
See application file for complete search history.

(56) References Cited

U.S. PATENT DOCUMENTS

| | | | |
|---|---|---|---|
| 3,016,177 A | | 1/1962 | Chaplin |
| 3,167,322 A | * | 1/1965 | Aichroth ...................... 277/453 |
| 3,531,040 A | | 9/1970 | Myny |
| 3,710,733 A | | 1/1973 | Story |
| 3,938,661 A | | 2/1976 | Carmody |
| 4,158,757 A | * | 6/1979 | Reichert et al. ........... 200/302.1 |
| 4,854,476 A | * | 8/1989 | Serio, Jr. ...................... 220/4.01 |
| 4,866,934 A | * | 9/1989 | Lindstedt ....................... 60/321 |
| 4,910,882 A | | 3/1990 | Goller |
| 5,045,636 A | * | 9/1991 | Johnasen ............. C07K 14/811 174/375 |
| 5,117,952 A | | 6/1992 | Suh |
| 5,223,996 A | | 6/1993 | Read |
| 5,293,282 A | * | 3/1994 | Squires et al. ............. 360/77.08 |
| 5,422,766 A | * | 6/1995 | Hack et al. ................ 360/99.18 |
| 5,491,608 A | | 2/1996 | Koyanagi et al. |
| 5,535,092 A | | 7/1996 | Bang |
| 5,641,068 A | | 6/1997 | Warner |
| 5,703,734 A | | 12/1997 | Berberich |
| 5,793,566 A | | 8/1998 | Scura |
| 6,073,770 A | | 6/2000 | Park |
| 6,347,021 B2 | | 2/2002 | Kazmierczak et al. |

(Continued)

OTHER PUBLICATIONS

Office Action dated Nov. 15, 2012 from U.S. Appl. No. 13/308,410, 11 pages.

(Continued)

*Primary Examiner* — Nathan Cumar
(74) *Attorney, Agent, or Firm* — Knobbe, Martens, Olson & Bear LLP (57) ABSTRACT

The invention relates to an improved seal that allows for a fastener-less/adhesive-less assembly retention method. In particular, the seal may comprise a plurality of integral retention prongs that allows permanent assembly with a plastic housing via friction. The seal is self-retaining, and thus, does not require a fastener or glue. The seal protects the interior of the enclosure from moisture and contaminants when exposed to a mobile environment. In addition, the seal provides sufficient resistance to deliver a proper sealing force and tactile feel to a user when closing the rugged enclosure, while maintaining its shape.

20 Claims, 13 Drawing Sheets

(56) References Cited

U.S. PATENT DOCUMENTS

| | | | |
|---|---|---|---|
| 6,460,859 B1* | 10/2002 | Hammi | F16J 15/122 |
| | | | 277/596 |
| 6,739,452 B2 | 5/2004 | Rochelo | |
| 6,749,446 B2 | 6/2004 | Nechitailo | |
| 6,832,444 B1* | 12/2004 | MacNeil | 40/209 |
| 6,840,381 B2 | 1/2005 | Stephens | |
| 6,845,006 B2 | 1/2005 | Kobayashi | |
| 6,896,134 B2 | 5/2005 | Russell et al. | |
| 6,968,954 B2 | 11/2005 | Hsieh | |
| 6,969,548 B1 | 11/2005 | Goldfine | |
| 7,156,401 B2* | 1/2007 | Merklein | F28F 9/0226 |
| | | | 165/149 |
| 7,362,541 B2 | 4/2008 | Bernett | |
| 7,430,116 B2 | 9/2008 | Liu | |
| 7,500,561 B2 | 3/2009 | Matias et al. | |
| 7,520,389 B2 | 4/2009 | Lalouette | |
| 7,584,851 B2 | 9/2009 | Hong et al. | |
| 7,701,705 B1 | 4/2010 | Szeremeta | |
| 7,810,639 B2 | 10/2010 | Djulaini et al. | |
| 7,886,903 B1 | 2/2011 | Wurzelbacher, Jr. et al. | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 2002/0114104 A1* | 8/2002 | Hearn et al. | 360/97.01 |
| 2005/0093246 A1* | 5/2005 | Dietle | F16J 15/008 |
| | | | 277/549 |
| 2005/0115860 A1 | 6/2005 | Mertz, II et al. | |
| 2006/0076253 A1 | 4/2006 | Hong et al. | |
| 2006/0087763 A1 | 4/2006 | Chua et al. | |
| 2006/0158775 A1 | 7/2006 | Sega et al. | |
| 2007/0036349 A1* | 2/2007 | Yang | H04M 1/23 |
| | | | 379/433.13 |
| 2008/0062636 A1 | 3/2008 | Liu | |
| 2009/0009945 A1 | 1/2009 | Johnson et al. | |
| 2009/0161309 A1 | 6/2009 | Yang | |
| 2010/0238623 A1 | 9/2010 | Pan | |
| 2011/0057392 A1* | 3/2011 | Monnet et al. | 277/312 |
| 2013/0062468 A1* | 3/2013 | Yokoi | 244/129.3 |

OTHER PUBLICATIONS

Office Action dated Feb. 6, 2013 from U.S. Appl. No. 13/308,410, 7 pages.
Office Action dated Nov. 27, 2012 from U.S. Appl. No. 13/430,455, 13 pages.
Office Action dated Feb. 6, 2013 from U.S. Appl. No. 13/430,455, 7 pages.
Office Action dated Nov. 5, 2013 from U.S. Appl. No. 13/308,410, 9 pages.
Office Action dated Jul. 12, 2013 from U.S. Appl. No. 13/430,455, 14 pages.
Final Office Action dated Nov. 7, 2013 from U.S. Appl. No. 13/430,455, 9 pages.
Interview Summary dated Apr. 5, 2013 from U.S. Appl. No. 13/308,410, 3 pages.
Interview Summary dated Apr. 4, 2013 from U.S. Appl. No. 13/430,455, 3 pages.
Advisory Action dated Jan. 22, 2014 from U.S. Appl. No. 13/430,455, 3 pages.
Office Action dated Jul. 15, 2013 from U.S. Appl. No. 13/308,410, 11 pages.
Advisory Action dated Jan. 7, 2014 from U.S. Appl. No. 13/308,410, 3 pages.
Office Action dated Jun. 26, 2014 from U.S. Appl. No. 13/430,455, 26 pages.
Office Action dated Jul. 11, 2014 from U.S. Appl. No. 13/308,410, 19 pages.
Final Office Action dated Oct. 24, 2014 from U.S. Appl. No. 13/308,410, 17 pages.
Advisory Action dated Dec. 10, 2014 from U.S. Appl. No. 13/308,410, 3 pages.
Final Office Action dated Jan. 7, 2015 from U.S. Appl. No. 13/430,455, 16 pages.
Examiner's Answer dated Jun. 30, 2015 from U.S. Appl. No. 13/308,410, 11 pages.
Advisory Action dated Mar. 20, 2015 from U.S. Appl. No. 13/430,455, 4 pages.

* cited by examiner

SELF RETAINING ELASTOMERIC SEAL

CROSS REFERENCE TO RELATED APPLICATIONS

This application is related to U.S. patent application Ser. No. 13/308,140, entitled "RUGGEDIZED ENCLOSURE FOR DATA STORAGE DEVICE," filed Nov. 30, 2011, which is incorporated by reference herein in its entirety.

BACKGROUND

Elastomeric seals and gaskets are widely used in the aerospace, aviation, commercial, medical and consumer electronics industries to provide hermetically sealed solutions. Elastomeric seals and gaskets are utilized for making leak-proof and durable connections.

Depending upon application, various seal attachment methods are used. An example is seal retention via adhesive or pressure exerted by two joints attached with the use of fasteners. Elastomeric seals may require "open" and "closed" conditions, such as in a vacuum chamber door or hermetically sealed medical case.

Unfortunately, for elastomeric seals and gaskets, the "open" and "closed" conditions mentioned above are challenging and often requires either adhesive or some other mechanical seal retention method. This complicates the manufacturing process and increases the overall costs. Accordingly, it would be desirable to provide methods, systems, and devices for improving the retention of elastomeric seals and gaskets.

BRIEF DESCRIPTION OF THE DRAWINGS

Systems and methods which embody the various features of the invention will now be described with reference to the following drawings, in which.

DETAILED DESCRIPTION

Embodiments of the present invention relate to an elastomeric seal that may be used in an enclosure for an external drive, such as an external disk drive. Notably, the seal of the present invention addresses at least three competing functions that have not been addressed in the prior art. First, the seal is self-retaining, and thus, does not require a fastener or glue. Self-retaining seals for an external drive enclosure, especially an enclosure that can be opened, are not described in the prior art. The self-retaining feature of the seal also allows it to be replaced or easily changed. Second, the seal protects the interior of the enclosure from moisture and contaminants when exposed to a mobile environment. Third, the seal provides sufficient resistance to deliver a proper sealing force and tactile feel to a user when closing the rugged enclosure, while maintaining its shape.

Certain embodiments of the inventions will now be described. These embodiments are presented by way of example only, and are not intended to limit the scope of the inventions. For example, an exemplary embodiment for an external disk drive is illustrated and described below with reference to the figures. However, those skilled in the art will recognize that the enclosure of the present invention may be adapted for use with any form of external drive. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
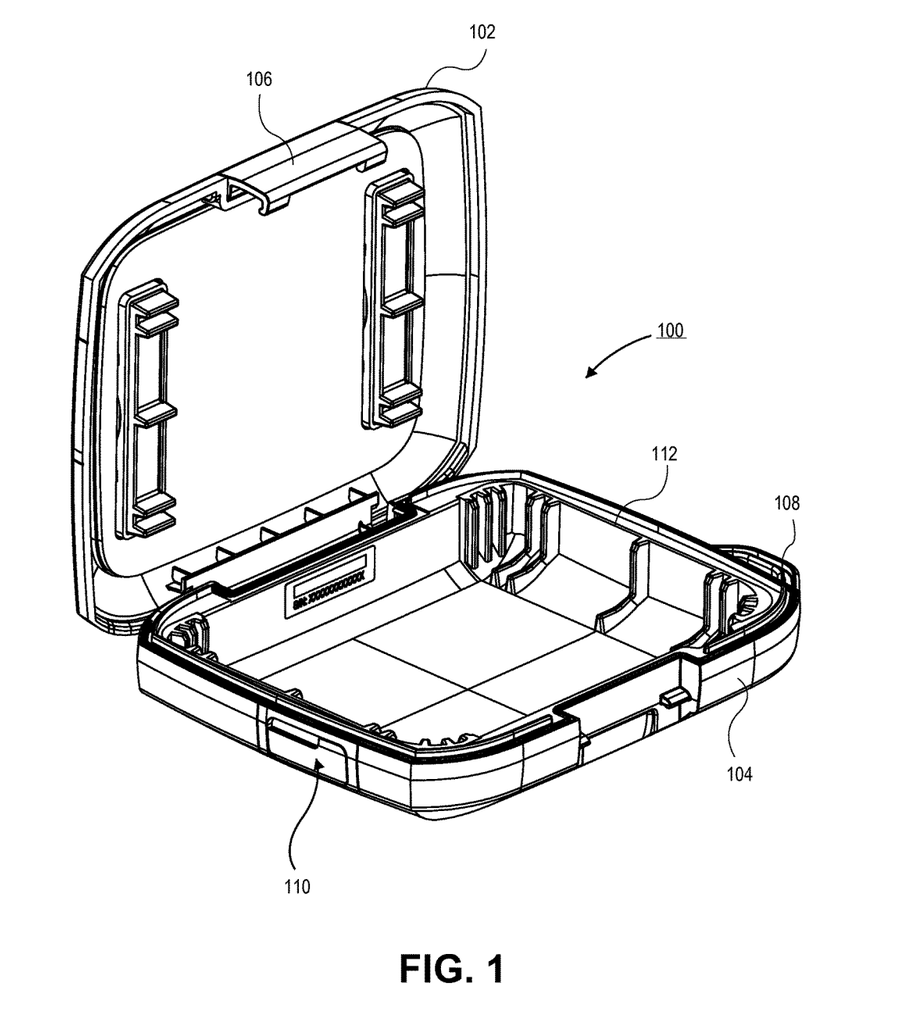
FIG. 1 shows an exemplary embodiment of a ruggedized enclosure for an external drive, such as a portable disk drive.

FIG. 1 shows an exemplary embodiment of a ruggedized enclosure 100 employing an elastomeric seal in its open configuration for an external drive, such as a portable disk drive. In general, the ruggedized enclosure 100 shown is designed to robustly protect any type of external drive, such as a portable disk drive, and allows for use of the storage device even while enclosed. The ruggedized enclosure 100 may be constructed from various materials, such as a rigid plastic, carbon fiber, metal, or combination thereof, to protect the enclosed drive and protect the device from exposure to a mobile environment having moisture, dust, and other contaminants. Furthermore, the ruggedized enclosure 100 may be configured to protect a portable disk drive from various levels of shock, such as a drop from 1-2 feet, 2-4 feet, 4-8 feet, etc., on to a hard surface. Related U.S. patent application Ser. No. 13/308,410, entitled "RUGGEDIZED ENCLOSURE FOR DATA STORAGE DEVICE," describes such an enclosure and is herein incorporated by reference in its entirety.

In some embodiments, the ruggedized enclosure 100 is configured to comply with various shock and vibration standards. For example, in one embodiment, the ruggedized enclosure 100 complies with the MIL-STD and/or ISO standards for shock and vibration. For example, the embodiments may be configured to comply with various aspects of MIL-STD 810.

In some embodiments, the ruggedized enclosure 100 may withstand shock levels equivalent to a free-fall of about seven to eight feet for a free-fall drop on to a hard surface, such as a floor or counter top. In addition, the ruggedized enclosure 100 may be relatively water-resistant, for example, a spill of water or other fluid while protecting an enclosed external drive. In yet other embodiments, the ruggedized enclosure 100 may be configured to be relatively water-tight or water-proof, such that the enclosure 100 can be partially or fully submerged in a liquid.

Furthermore, as noted above, the ruggedized enclosure 100 may be configured to prevent dust or other airborne contaminants. Indeed, the ruggedized enclosure 100 may comprise various seals capable of preventing dust from entering its internal space when enclosed as well as filtering elements.

As shown, the ruggedized enclosure 100 may comprise an upper portion, cover 102, a lower portion, bottom 104, a latch 106, a retaining feature 108, a port 110, and an elastomeric seal 112. As to dimension, the ruggedized enclosure 100 may be generally about 5.5 inches in length, 4.5 inches in width, and 1.5 inches in height. Of course, these dimensions may vary depending on the desired data storage devices or external drives to be enclosed. These components will now be further described.

The cover 102 serves as a top portion enclosing the ruggedized enclosure 100. The cover 102 may be coupled to the bottom 104 of the ruggedized enclosure 100 via various mechanisms, such as a hinge (not shown in FIG. 1). In order to minimize the size of the ruggedized enclosure 100, the hinge may have a low profile and be constructed so as not to protrude beyond the overall form factor of the ruggedized enclosure 100. In the embodiment shown, the cover 102 is attached to the bottom 104 with this type of low profile, flat hinge. In other embodiments, the cover 102 may be detachable from the bottom 104, for example, using a fastener, a strap, etc.

As shown in FIG. 1, the cover 102 is constructed from an opaque material that is relatively rigid sufficient to protect a portable disk drive from mechanical shock and exposure. In other embodiments, the cover 102 may comprise various features, such as a transparent portion to allow viewing of the interior of the ruggedized enclosure 100, or a display, such as a liquid crystal display or electronic ink display. Furthermore, the cover 102 may comprise one or more identification spaces to allow a user to label the ruggedized enclosure 100 and indicate any contents enclosed.

The bottom 104 provides a corresponding portion to the cover 102 to provide a protected enclosed space to hold a portable disk drive. The bottom 104 may be constructed from the same or different materials as the cover 102. Like the cover 102, the bottom 104 may simply be opaque or may comprise various features, such as a transparent portion to allow viewing of the interior of the ruggedized enclosure, or a display, such as a liquid crystal display or electronic ink display. Furthermore, the bottom 104 may comprise one or more identification spaces to allow a user to label the ruggedized bottom 104 and indicate any contents enclosed.

The latch 106 provides a mechanism for closing and sealing the ruggedized enclosure 100 when in its closed configuration. As shown, the latch 106 is configured as a flat tongue-like piece that does not protrude beyond the overall form factor of the ruggedized enclosure 100. In other embodiments, the ruggedized enclosure 100 may be held in its closed configuration with other mechanisms, such as a fastener, slider, twist lock, cam lock, etc. In some embodiments, the latch 106 is configured to provide approximately 20 Newtons or 5-8 lbs of closing force to maintain the enclosure in its closed configuration even during shock conditions.

The retaining feature 108 is an optional feature that allows the ruggedized enclosure 100 to be attached or retained to another device or item. For example, as shown in FIG. 1, the retaining feature 108 is a loop or utility hook. In other embodiments, the retaining feature 108 may be a mechanism, such as a hook, a lanyard, etc.

The port 110 provides a passage for allowing access to a portable disk drive while enclosed. As shown, the port 110 may comprise a sealing mechanism, such as a door, or slider that allows for passage of a cable, such as a Universal Serial Bus (USB) cable. In the embodiment shown, the port 110 provides for a physical passage into the interior of the ruggedized enclosure.

In other embodiments, rather than a mechanical opening or passage, the port 110 may be configured as an electrical connector that preserves the mechanical integrity of the ruggedized enclosure 100. For example, the port 110 may be a male or female USB connector that is then electrically coupled to a portable disk drive while inside the enclosure 100.

As shown, the elastomeric seal 112 is provided in the bottom 104 and provides a seal against moisture, dust, etc., when the ruggedized enclosure 100 is in its closed configuration. The seal 112 is configured based on its size and shape to provide for a sufficient latching force to hold the enclosure 100 closed, but also allowing for an acceptable level of effort to open the enclosure 100 by a user. In some embodiments, the elastomeric seal 112 is constructed from a compliant material, such as an elastomeric material, a plastic, or rubber, or combination of materials.

Furthermore, in some embodiments, the elastomeric seal 112 is self-retaining. That is, the seal 112 does not require a separate fastener or glue to be held into place in the bottom 104. This allows the seal 112 to be easily replaced or changed. For example, related U.S. patent application Ser. No. 13/308,410, entitled "RUGGEDIZED ENCLOSURE FOR DATA STORAGE DEVICE," may be used in the embodiments and is incorporated by reference herein in its entirety. As will be shown in FIGS. 6-15, the elastomeric seal 112 may comprise various retention features, such as prongs, clips, etc., that retain the seal within a corresponding channel in the bottom 104.

Figure 2:
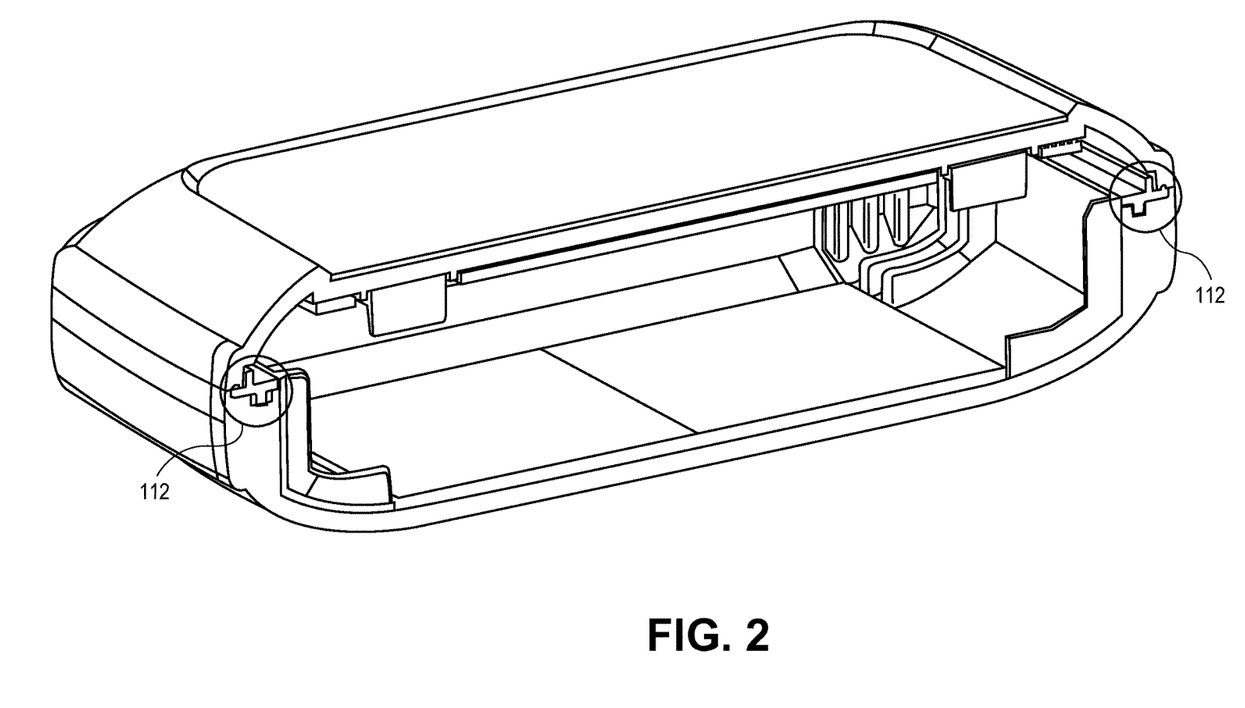
FIG. 2 shows a cutaway side view of the ruggedized enclosure shown in FIG.

FIG. 2 shows a cutaway side view of the ruggedized enclosure of FIG. 1 in its closed configuration. As can be seen, a side view of portions of seal 112 is also shown. The seal 112 is provided in bottom 104 and comprises several features that make it self-retaining while providing sufficient sealing of the enclosure 100. These features will now be further described with reference to FIGS. 3-16.

Figure 3:
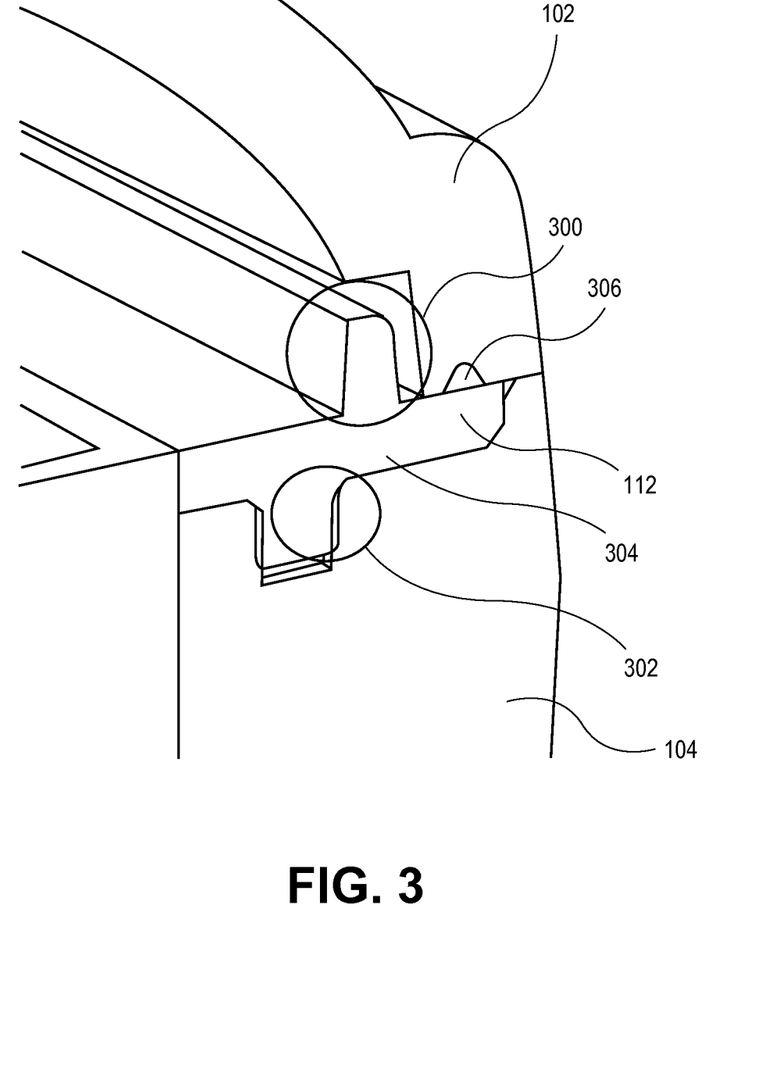
FIG. 3 shows a close-up view of a portion of the elastomeric seal shown in FIG. 2.

FIG. 3 shows a close-up view of a portion of the elastomeric seal 112 shown in FIG. 2. As shown, the seal 112 comprises a sealing wall 300, a retention feature 302, a central body 304, and a sealing body 306. These portions of the seal 112 will now be further described below.

Sealing wall 300 serves as an obstruction structure sealing structure for the seal 112 to prevent moisture and contaminants from entering the enclosure 100 when in its closed configuration. In addition, the sealing wall 300 provides a structure that captivates the seal 112 in place, especially during shock conditions. As shown, the sealing wall 300 may comprise a rib-like structure that extends from the central body 304 and is in proximity to a corresponding surface on the cover 102 of the enclosure 100. In other embodiments, the sealing wall 300 may be configured to come into contact with a corresponding surface on the cover 102.

Figure 4:
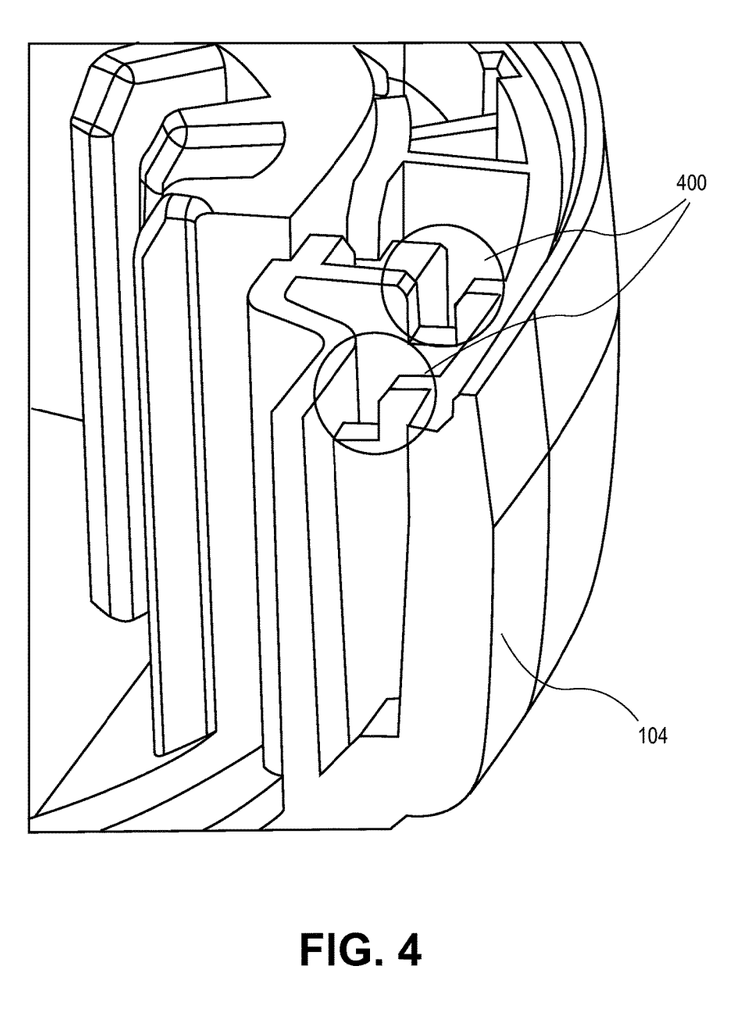
FIG. 4 shows a detailed view of a corner portion of a receiving groove in the bottom of the enclosure for the elastomeric seal.

Retention feature 302 serves as a structure that retains the seal 112 into the bottom 104. In one embodiment, the retention feature 302 is a rib-like structure that extends from the central body 304 and is frictionally held in a groove in the bottom 104. FIG. 4 shows a view of this receiving groove. As shown in FIG. 3, the retention feature 302 may rely on frictional retention as well as mechanical retention to hold the seal 112 in place.

The retention feature 302 may, of course, have other shapes or features. For example, the retention feature 302 may comprise a latch or snap-in feature to mechanically hold the seal 112 in place in the bottom 104. As will be shown in other figures, the shape and nature of the retention features on the seal 112 may vary depending on their location around the perimeter of the bottom 104.

Central body 304 serves as a main body of the seal and provides support for the retention feature 302 and sealing element 306. As will be described below, the central body 304 may be configured as a ring-like structure that traverses around an inner perimeter of the bottom 104 of the enclosure.

Sealing element 306 provides a sealing structure that extends from the central body 304 and contacts a corresponding-shaped receiving portion in the top cover 102. As shown, the sealing element 306 is configured as a conical or trapezoidal rib-like structure to provide a sealing surface and substantially serves as a gasket. Of course, the sealing element 306 may have any of a variety of shapes and geometries depending on the desired sealing, closing force for enclosure 100, etc.

The sealing element 306 is configured to contact a corresponding groove in the cover 102. Thus, when closed, the cover 102 applies a predictable deformation of element 102 resulting in a compressive force, such as about 20 Newtons, as the sealing element 304 and other portions of the seal 112 come in contact with the cover 102. In one embodiment, the seal 112 is constructed from flexible, elastomeric material to allow for a predetermined deformation and allow for imperfections in the bottom 104 or cover 102.

FIG. 4 shows a detailed view of a corner portion of a receiving groove 400 in the bottom 104 of the enclosure for the elastomeric seal 112. In particular, as shown, the receiving groove 400 provides an interference structure that contacts the retention feature 302 (not shown in FIG. 4). This interference structure 400 thus provides a frictional force to hold the seal 112 in place. Of course, in other embodiments, the groove 400 may comprise various slots or other shapes to mechanically grip or lock the seal 112 in place. For purposes of illustration, FIGS. 11-15 show other side, cutaway views of the seal 112 at various locations to illustrate different shapes and sizes of the sealing elements and retention features that may be used in the embodiments.

Figure 5:
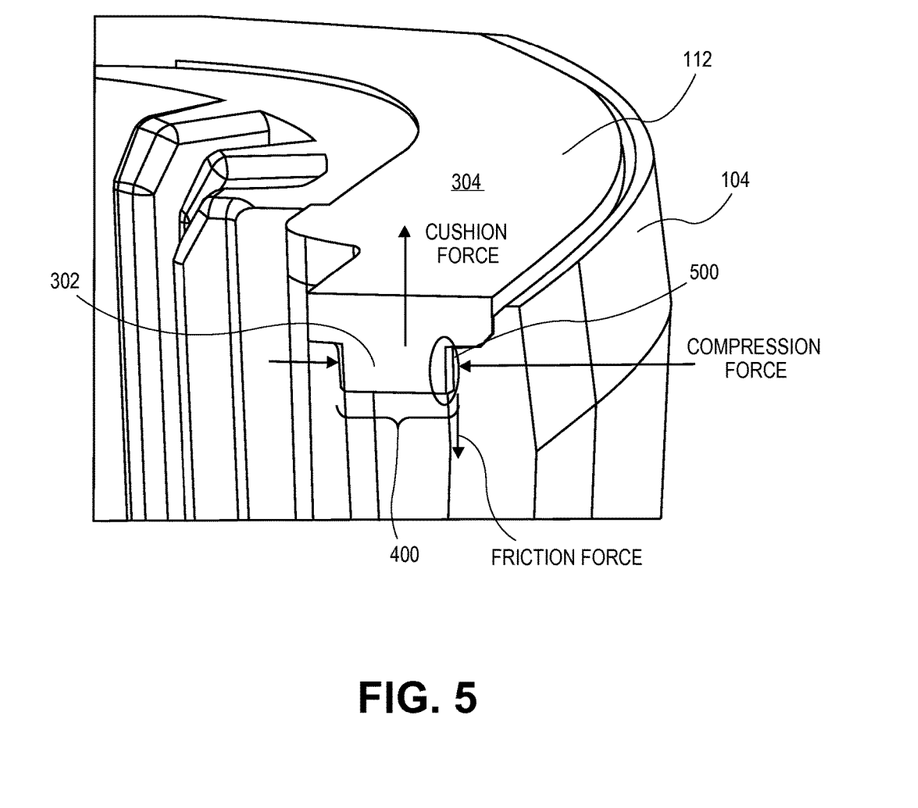
FIG. 5 shows a simplified diagram of the force vectors experienced by the elastomeric seal in a corner portion of the bottom of the enclosure.

FIG. 5 shows a simplified diagram of the force vectors experienced by the elastomeric seal in a corner portion of the bottom of the enclosure. For purposes of illustration, the top portion of the seal 112 is cut away to simplify the figure. As shown, the seal 112 is held in the groove 400 of the bottom 104 of the enclosure based on a combination of compression forces and friction forces. For example, the groove 400 provides at least an interference zone 500 to frictionally hold the seal 112 in place. in addition, as shown, the groove 400 is sized to apply a compression force on the sides of the retention feature 302. As a result, during vibration or shock, frictional forces and compression forces apply to hold the seal 112 in place. In other embodiments, the seal 112 may employ different types of retention features 302 that rely upon mechanical retention as well as compression and frictional forces.

Moreover, the elastomeric seal 112 provides a cushioning force based on the compliance of its central body 304. The cushioning force may serve several functions. First, the cushioning force of the seal 112 may serve to dampen shock experienced by the enclosure 100. Also, the cushioning force of the seal 112 may assist in keeping the enclosure 100 in its closed configuration.

FIGS. 6-15 will now be described to further describe an embodiment of the seal. As noted, the seal 112 is configured to provide a novel combination of self-retention, sealing effectiveness, and latching force. In addition, the embodiments of the present invention allow for manufacture of the seal with a single axis pull and of the seal and mating slots/pockets on the bottom 104.

Figure 6:
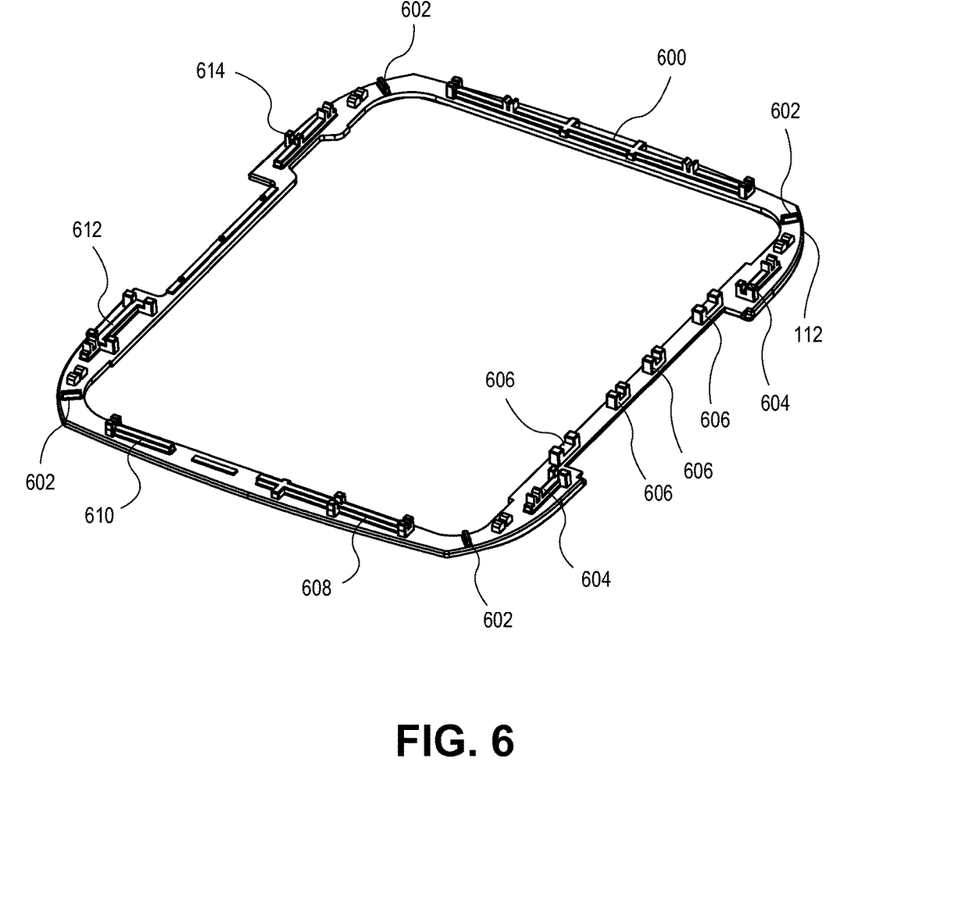
FIG. 6 shows a bottom, elevation view of an embodiment of the elastomeric seal.

FIG. 6 shows a bottom, elevation view of an embodiment of the elastomeric seal. As shown, the seal 112 on its top portion that faces toward the cover 102 may comprise various sealing elements. For example, as shown, the seal 112 may comprise retention features, 600, 602, 604, 606, 608, 610, and 612. The size and shapes of these retention features may vary depending on their location and desired anchoring of the seal 112.

For example, retention feature 600 may be provided along a top portion of the seal 112 and provides an elongated rib to retain the seal 112. Retention features 602 may be provided at each corner of the seal 112. Retention features 604 and 606 are provided for anchoring near a hinge between the cover 102 and bottom 104. Retention feature 608 and 610 are provided along the bottom of the seal 112 while providing a space for the port 110. Finally, retention elements 612 and 614 are provided for retaining the seal 112 around the latch 106.

Figure 7:
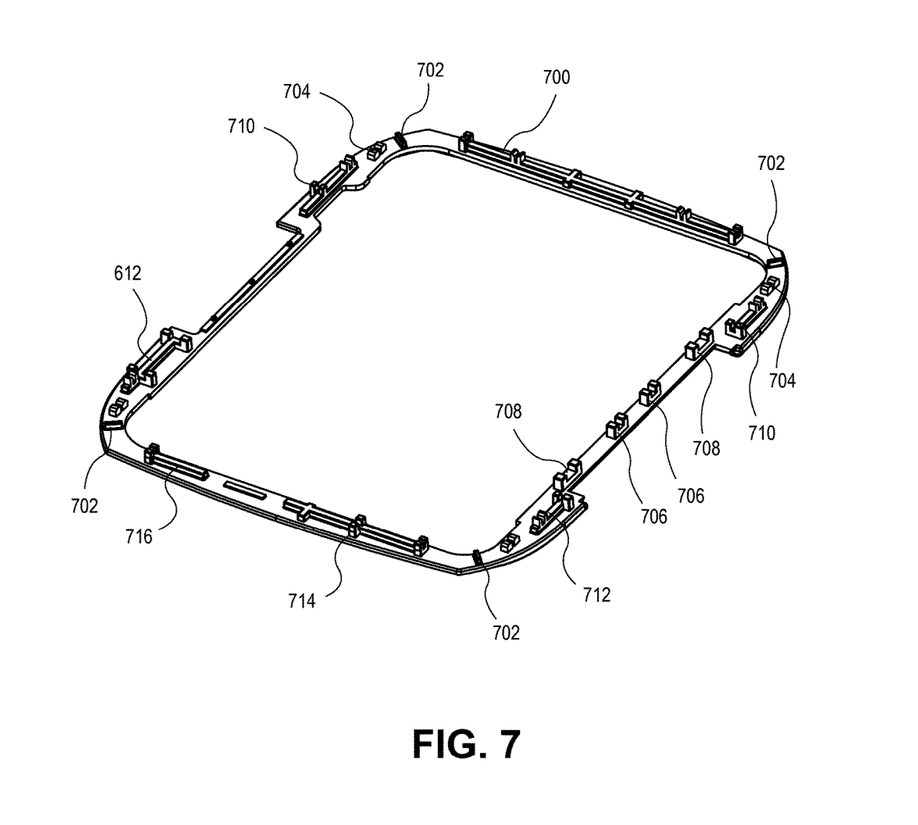
FIG. 7 shows a bottom, elevation view of another embodiment of the elastomeric seal shown.
Figure 10:
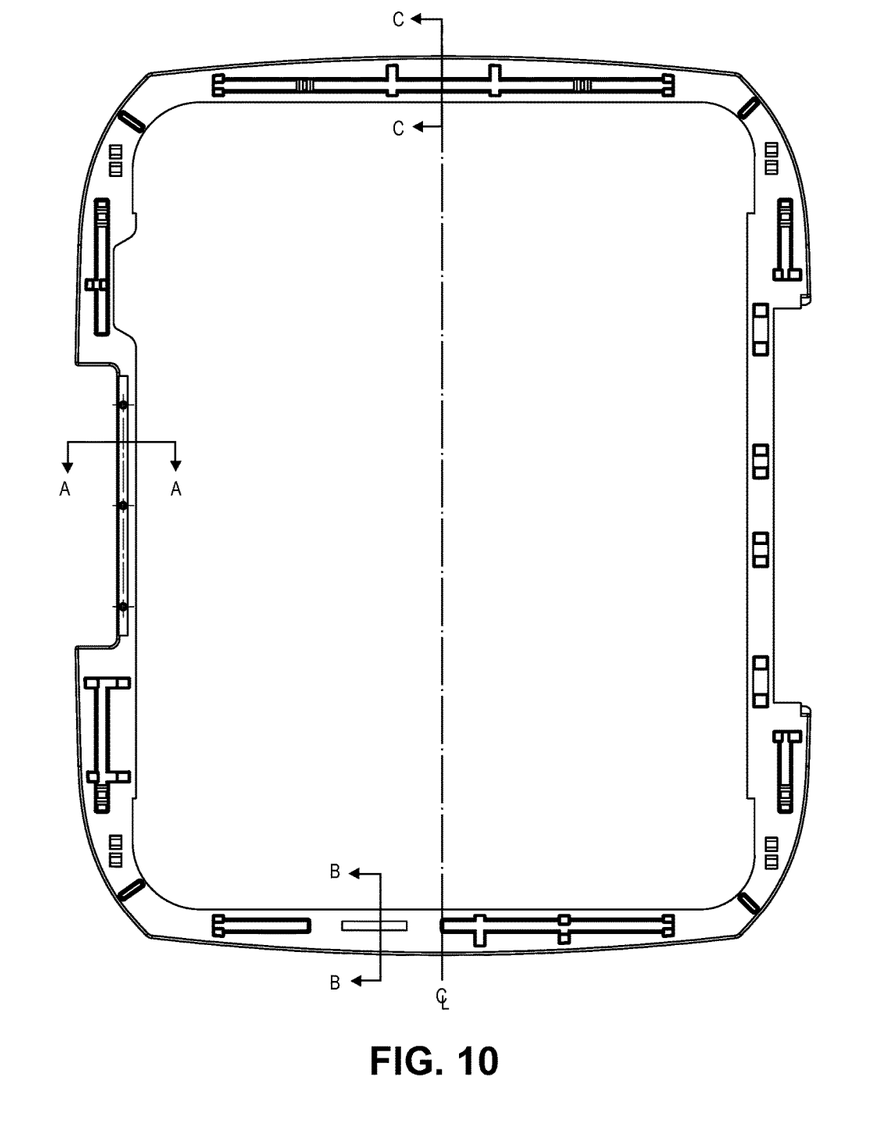
FIG. 10 shows a bottom, plan view of the elastomeric seal.

FIG. 7 shows a bottom, elevation view another embodiment of the elastomeric seal. In addition, FIG. 10 shows a bottom plan view of the elastomeric seal shown in FIG. 7. As shown, the seal 112 may comprise a plurality of retention elements 700, 702, 704, 706, 708, 710, 712, 714, and 716 that extend into the bottom 104. In this embodiment, the retention elements extend deeper into the bottom 104 and may comprise clip-like anchors to captivate the seal 112. As can be seen, the retention elements may have different sizes and shapes to secure the seal 112 into the bottom 104 depending on their location. In the embodiment shown in FIG. 7, the retention elements are placed in locations around the seal 112 at strategic locations, such as the corners, around the latch, etc. FIG. 10 shows a bottom plan view of the elastomeric seal shown in FIG. 7.

Figure 8:
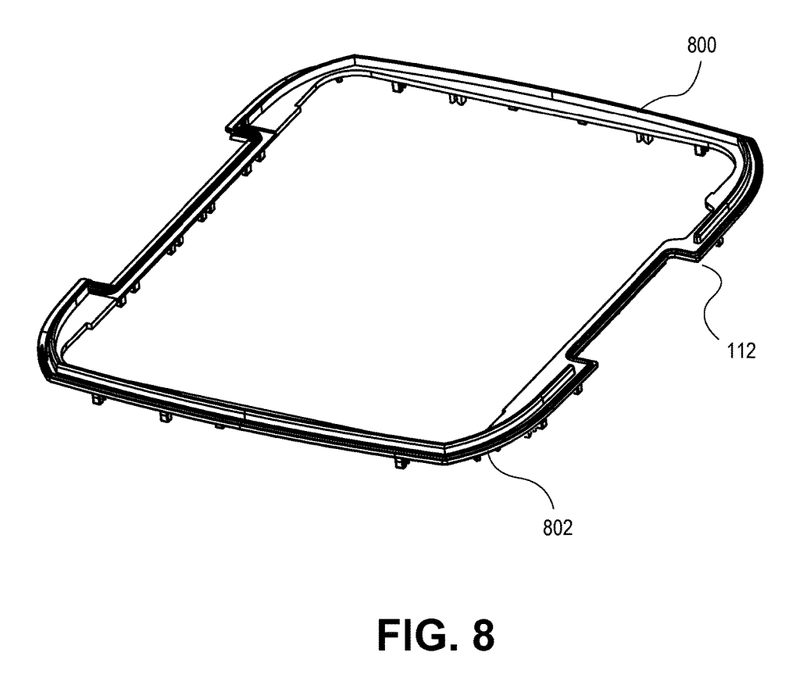
FIG. 8 shows a top, elevation view of another embodiment of the elastomeric seal.
Figure 9:
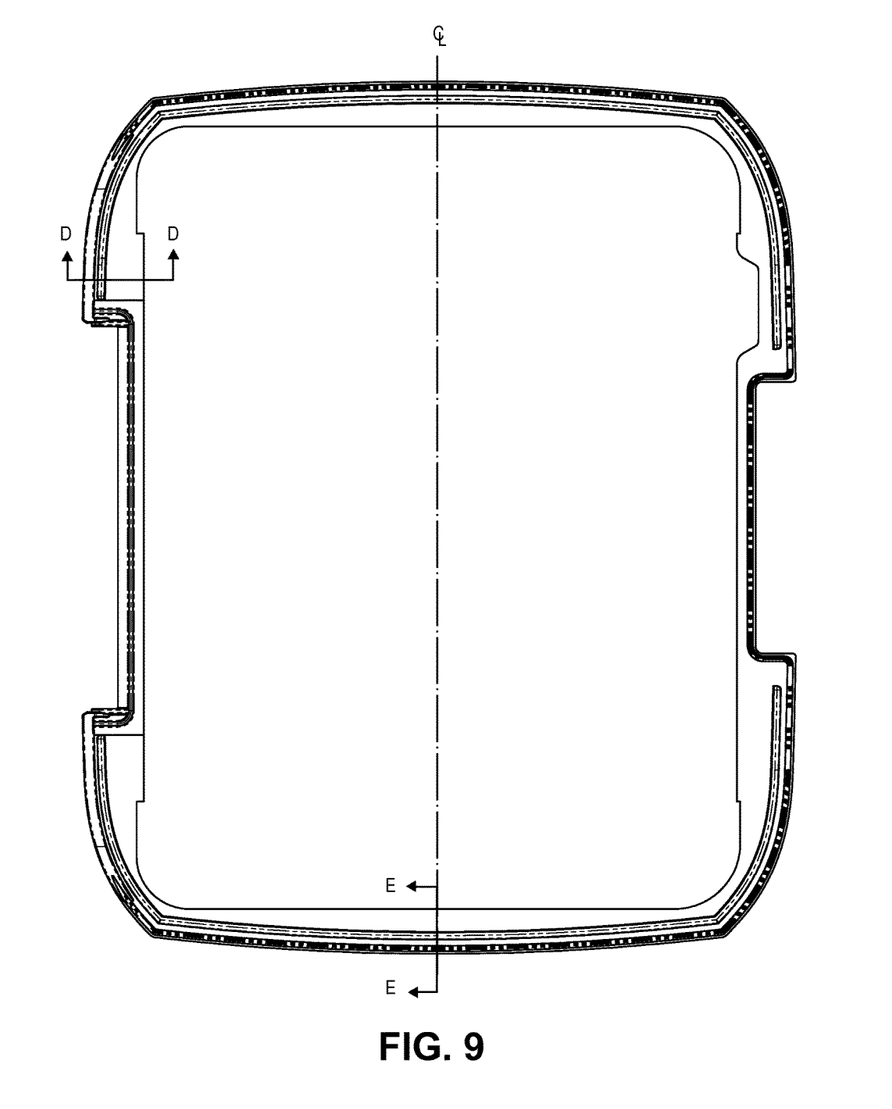
FIG. 9 shows a top, plan view of the elastomeric seal shown in FIG. 8.

FIG. 8 shows a top, elevation view of another embodiment of the elastomeric seal. As shown, the seal 112 comprises sealing wall 800 and a sealing element 802. As can be seen, the sealing wall 800 is an elongated, rib-like structure that traverse around the perimeter of the seal 112. In addition, the sealing element 802 provides a sealing structure that extends from the seal 112 and contacts a corresponding-shaped receiving portion in the top cover 102. FIG. 9 shows a top plan view of the elastomeric seal shown in FIG. 8.

Figure 11:
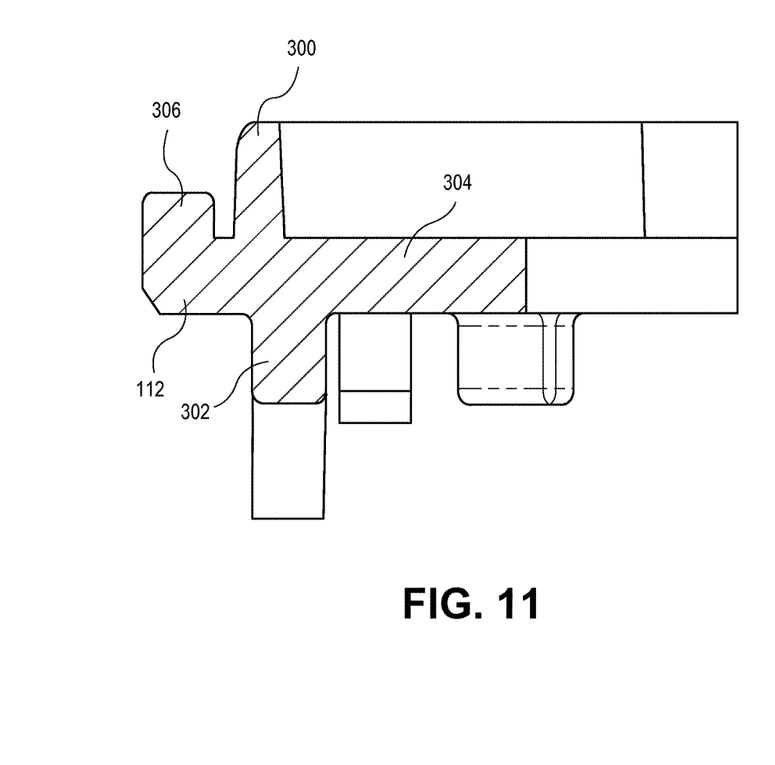
FIG. 11 shows a side, cutaway view of the elastomeric seal at D-D.
Figure 12:
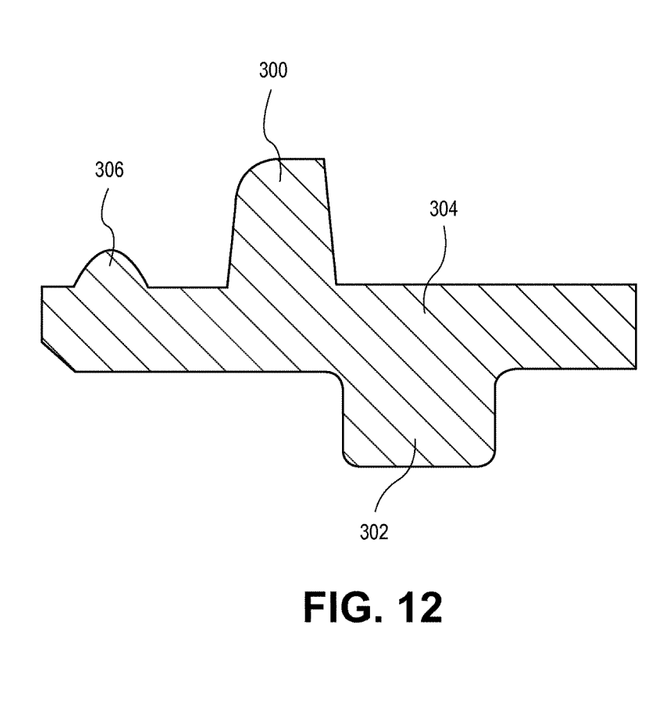
FIG. 12 shows a side cutaway view of the elastomeric seal at E-E.
Figure 13:
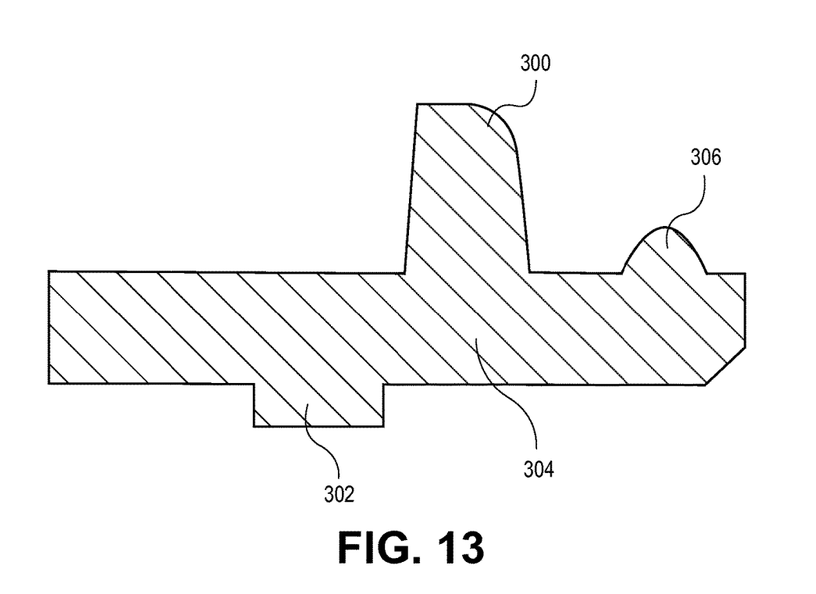
FIG. 13 shows a side cutaway view of the elastomeric seal at B-B.
Figure 14:
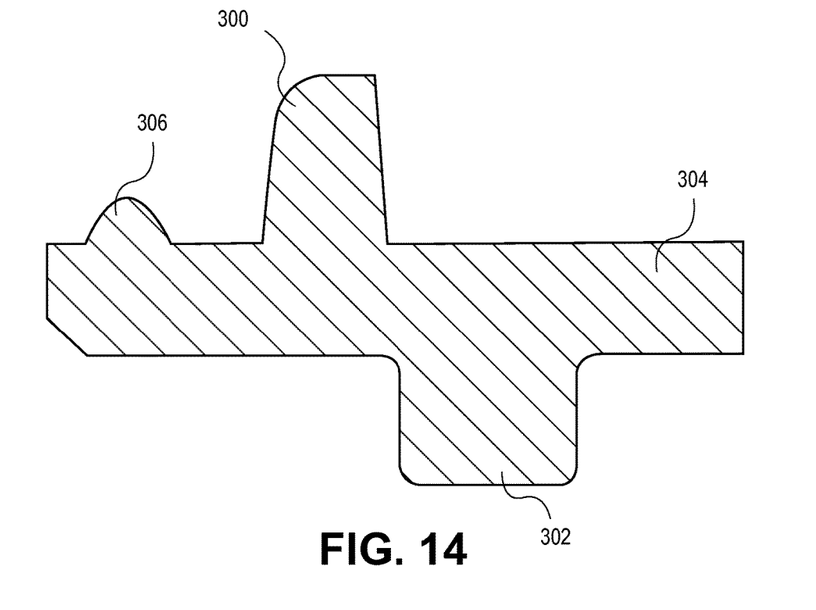
FIG. 14 shows a side cutaway view of the elastomeric seal at C-C.
Figure 15:
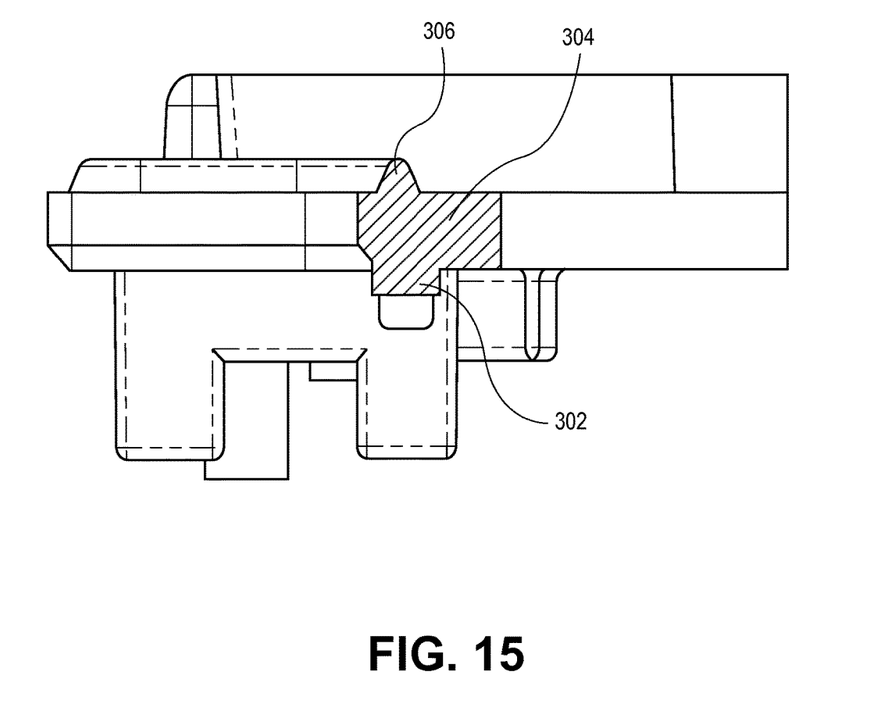
FIG. 15 shows a side cutaway view of the elastomeric seal at A-A.

FIG. 11 shows a side, cutaway view of the elastomeric seal at D-D. FIG. 12 shows a side cutaway view of the elastomeric seal at E-E. FIG. 13 shows a side cutaway view of the elastomeric seal at B-B. FIG. 14 shows a side cutaway view of the elastomeric seal at C-C. FIG. 15 shows a side cutaway view of the elastomeric seal at A-A. As shown, the elastomeric seal 112 may comprise different shapes for sealing wall 300, retention feature 302, central body 304, and sealing element 306 that vary depending on the relative location around the perimeter of the enclosure 100.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A self-retaining elastomeric seal for an enclosure configured to enclose an external data storage device, wherein the enclosure comprises a first portion comprising a rib receiving structure and a second portion comprising a plurality of separate recesses defining a corresponding plurality of interference zones, the self-retaining elastomeric seal configured to be disposed around a perimeter of the enclosure, between and in contact with the first portion and the second portion, the self-retaining elastomeric seal comprising:
an elastomeric main body configured to prevent contaminants from entering the enclosure and comprising:
a first surface comprising a continuous elongated rib structure facing the first portion of the enclosure, the continuous elongated rib structure extending around the perimeter of the enclosure and configured to be received in the rib receiving structure; and
a second surface facing the second portion of the enclosure; and
a plurality of separate, spaced apart retention features defined in the second surface of the elastomeric main body and aligned around each side of the perimeter of the enclosure, wherein:
the plurality of separate, spaced apart retention features extend away, in a single direction relative to a same plane, from the elastomeric main body at a respective separate location along the elastomeric main body; and
each of the plurality of separate, spaced apart retention features is configured to extend into a corresponding one of the plurality of separate recesses in the second portion of the enclosure and to create sufficient friction with corresponding interference zones within the plurality of separate recesses in the enclosure to retain the self-retaining elastomeric seal.

2. The self-retaining elastomeric seal of claim 1, wherein at least some of the plurality of separate, spaced apart retention features comprise a rectangular body that is shaped to frictionally contact the enclosure along sides of the rectangular body.

3. The self-retaining elastomeric seal of claim 1, wherein:
the elastomeric main body comprises a generally rectangular shape; and
the plurality of separate, spaced apart retention features are disposed along sides of the generally rectangular shape.

4. The self-retaining elastomeric seal of claim 1, wherein the self-retaining elastomeric seal is configured to provide a latching force on the enclosure of about 20 Newtons.

5. The self-retaining elastomeric seal of claim 1, wherein the elastomeric main body comprises a sealing element that provides a contact seal with portions of the first and second portions of the enclosure while the enclosure is closed.

6. The self-retaining elastomeric seal of claim 1, wherein the plurality of separate, spaced apart retention features comprise retention prongs.

7. The self-retaining elastomeric seal of claim 1, wherein the plurality of separate, spaced apart retention features comprises:
a first retention feature extending for a first length along the perimeter of the enclosure; and
a second retention feature extending for a second, different length along the perimeter of the enclosure.

8. The self-retaining elastomeric seal of claim 7, wherein the first retention feature and the second retention feature are located along a same side of the enclosure.

9. The self-retaining elastomeric seal of claim 8, wherein a space is provided between the first retention feature and the second retention feature, the space providing access to a port of the external data storage device within the enclosure.

10. The self-retaining elastomeric seal of claim 1, wherein a first retention feature of the plurality of separate, spaced apart retention features extends along a majority of one side of the enclosure.

11. A self-retaining elastomeric seal for an enclosure configured to enclose an external data storage device, wherein the enclosure comprises a first portion comprising a rib receiving structure and a second portion comprising a plurality of separate recesses defining a corresponding plurality of interference zones, the self-retaining elastomeric seal configured to be disposed around a perimeter of the enclosure, between and in contact with the first portion and the second portion, the self-retaining elastomeric seal comprising:
an elastomeric main body configured to prevent contaminants from entering the enclosure and comprising:
a first surface comprising a continuous elongated rib structure facing the first portion of the enclosure, the continuous elongated rib structure extending around the perimeter of the enclosure and configured to be received in the rib receiving structure; and
a second surface facing the second portion of the enclosure; and
a plurality of separate, spaced apart retention means defined in the second surface of the elastomeric main body and aligned around each side of the perimeter of the enclosure, wherein:
the plurality of separate, spaced apart retention means extend away, in a single direction relative to a plane, from the elastomeric main body at a respective separate location along the elastomeric main body; and
each of the plurality of separate, spaced apart retention means is configured to extend into a corresponding one of the plurality of separate recesses in the second portion of the enclosure and to create sufficient friction with corresponding interference zones within the plurality of separate recesses in the enclosure to retain the self-retaining elastomeric seal.

12. The self-retaining elastomeric seal of claim 11, wherein at least some of the plurality of separate, spaced apart retention means comprise a rectangular body that is shaped to frictionally contact the enclosure along sides of the rectangular body.

13. The self-retaining elastomeric seal of claim 11, wherein:
the elastomeric main body comprises a generally rectangular shape; and
the plurality of separate, spaced apart retention means are disposed along sides of the generally rectangular shape.

14. The self-retaining elastomeric seal of claim 11, wherein the self-retaining elastomeric seal is configured to provide a latching force on the enclosure of about 20 Newtons.

15. The self-retaining elastomeric seal of claim 11, wherein the elastomeric main body comprises a sealing element that provides a contact seal with portions of the first and second portions of the enclosure while the enclosure is closed.

16. The self-retaining elastomeric seal of claim 11, wherein the plurality of separate, spaced apart retention means comprise retention prongs.

17. The self-retaining elastomeric seal of claim 11, wherein the plurality of separate, spaced apart retention means comprises:
   a first retention feature extending for a first length along the perimeter of the enclosure; and
   a second retention feature extending for a second, different length along the perimeter of the enclosure.

18. The self-retaining elastomeric seal of claim 17, wherein the first retention feature and the second retention feature are located along a same side of the enclosure.

19. The self-retaining elastomeric seal of claim 18, wherein a space is provided between the first retention feature and the second retention feature, the space providing access to a port of the external data storage device within the enclosure.

20. The self-retaining elastomeric seal of claim 11, wherein a first retention feature of the plurality of separate, spaced apart retention means extends along a majority of one side of the enclosure.

\* \* \* \* \*

UNITED STATES PATENT AND TRADEMARK OFFICE
CERTIFICATE OF CORRECTION

PATENT NO. : 9,892,762 B1  
APPLICATION NO. : 13/308423  
DATED : February 13, 2018  
INVENTOR(S) : Wojciech Szeremeta et al.

It is certified that error appears in the above-identified patent and that said Letters Patent is hereby corrected as shown below:

In Column 1 at Line 7, Change "13/308,140," to --13/308,410,--.

In Column 7 at Line 33, In Claim 1, change "to a same" to --to a--.

Signed and Sealed this  
Twenty-eighth Day of August, 2018

Andrei Iancu  
*Director of the United States Patent and Trademark Office*